United States Patent [19]
Nuyts

[11] Patent Number: 5,773,768
[45] Date of Patent: *Jun. 30, 1998

[54] TRANSPORT AND ON-BOARD WEIGHING DEVICE WITH A STABILIZER THEREOF

[75] Inventor: Henry Nuyts, Retie, Belgium

[73] Assignee: NV Nuyts Orb, Oud-Turnhout, Belgium

[*] Notice: The term of this patent shall not extend beyond the expiration date of Pat. No. 5,578,798.

[21] Appl. No.: 756,015

[22] Filed: Nov. 25, 1996

Related U.S. Application Data

[63] Continuation-in-part of Ser. No. 169,664, Dec. 20, 1993, Pat. No. 5,578,798.

[30] Foreign Application Priority Data

Dec. 22, 1992 [BE] Belgium ............................... 09201128
Sep. 24, 1993 [BE] Belgium ............................... 09300998

[51] Int. Cl.⁶ ............................................. G01G 19/08
[52] U.S. Cl. .................... 177/136; 177/137; 177/138; 177/139; 177/141
[58] Field of Search .................. 177/136, 137, 177/138, 139, 141, 154, 155, 156

[56] References Cited

U.S. PATENT DOCUMENTS

| | | | |
|---|---|---|---|
| 2,109,460 | 3/1938 | Brasher | 177/136 |
| 3,580,343 | 5/1971 | Hogue et al. | 177/136 |
| 4,905,780 | 3/1990 | Goff, III | 177/136 |
| 5,369,222 | 11/1994 | Strelioff | 177/136 |
| 5,393,936 | 2/1995 | Tyhy et al. | 177/138 |
| 5,578,798 | 11/1996 | Nuyts | 177/136 |
| 5,635,680 | 6/1997 | Dojan | 177/136 |

FOREIGN PATENT DOCUMENTS

| | | |
|---|---|---|
| 0 476 778 | 3/1992 | European Pat. Off. . |
| 35 01 667 | 8/1985 | Germany . |

Primary Examiner—Renee S. Luebke
Assistant Examiner—Randy W. Gibson
Attorney, Agent, or Firm—Foley & Lardner

[57] ABSTRACT

A transport, such as a truck, has an on-board weighing device, which has at least two weighing frames for supporting a load, such as a container and its content, to be weighed. Each weighing frame is suspend relative to a transport chassis either directly or indirectly with a supporting frame, using at least one connecting element, which includes a load cell for measuring the weight of the load. The weighing frames, supporting frames, and connecting elements form a weighing unit that can be connected to the transport chassis. The weighing unit can include a separate lifting device for lifting the load away from the chassis, but is not always needed. A locking load stabilizer can be included to stabilize the load during transporting, loading, or unloading. The stabilizer can eliminate the need for a separate lifting device.

16 Claims, 11 Drawing Sheets

TRANSPORT AND ON-BOARD WEIGHING DEVICE WITH A STABILIZER THEREOF

CROSS-REFERENCE

This is a continuation-in-part of U.S. application Ser. No. 08/169,664, filed Dec. 20, 1993, now U.S. Pat. No. 5,578,798, which claims priority to Belgian Application No. 09201128, filed Dec. 22, 1992, and Belgian Application No. 09300998, filed Sept. 24, 1993. The U.S. and Belgian applications in their entirety are incorporated herein by reference.

BACKGROUND OF THE INVENTION

It is desirable to have an on-board weighing device in a transport, such as a truck or train, to determine the weight of the load being transported. A German patent publication, DE-A-3 501 667, for instance, discloses a weighing platform for supporting a load. The weighing platform is essentially suspended at its four corners from a vehicle chassis or frame using four flexible connecting elements, each of which includes a load cell that measures the force exerted on the weighing platform. Such a weighing platform may be suitable for weighing cattle, for example, which can be measured as they are being loaded onto it. Although the weight of any goods placed on the weighing platform can be measured, it is less suitable for transporting and weighing a large container or load.

Since a relatively large container can hold a considerable weight, the weighing platform and the connecting elements, and their suspension points need to handle such a load. The load cells must also be capable of measuring a high load. Due to the weight, the distance between the weighing platform and the suspension points connecting to the vehicle chassis needs to be great, which distance can result in the weighing platform experiencing a considerable movement (swinging) along its plane as well. The vehicle stability during weighing can be adversely affected by the platform movement. Substantially the same applies for transporting and weighing a loading body or loading frame, which has to be weighed after loading the goods.

A European patent publication, EP-A-0 476 778 by the present inventor, contemplates reducing the distance between the connecting points of the connecting elements to address the noted problems. Nonetheless, there is a need for a weighing device that makes it convenient to stabilize a container or loading body or a loading frame during weighing or transporting or both. The present invention meets this need.

SUMMARY OF THE INVENTION

The present invention contemplates a transport and an on-board weighing device thereof, which is capable of weighing a load and stabilizing the load at least during the transporting stage. The weighing device is adapted to be mounted to a transport (vehicle). The weighing device includes at least two weighing frames for supporting a load to be weighed. The weighing frames are adapted to be suspended from a chassis of the vehicle. The weighing device also includes a plurality of connecting elements, each having an upper connecting joint and a lower connecting joint. One of the upper and lower joints of each of the connecting elements is operatively connected to the chassis and the other of the upper and lower joints is connected to one of the weighing frames to thereby suspend the weighing frames from the chassis. The upper joints can be connected to the supporting frames and the lower joints can be connected to the weighing frames. Each of the connecting elements carries a load cell for measuring the force exerted thereto by the weighing frame. The load exerts a force through an axis extending through the upper and lower joints of each connecting element and applies a strain to each of the load cells. The strain corresponds to the load applied thereto.

According to the invention, the weighing device includes a stabilizer adapted to selectively immobilize the weighing frames relative to the chassis. The stabilizer comprises at least a pair of locks movable between a first position and a second position. In the first position, the locks are adapted to lock or immobilize the weighing frames relative to the chassis. In the second position, the locks are adapted to release the weighing frames from the chassis so that the connecting elements suspendedly support the weighing frames.

Supporting frames can be fixedly connected to the chassis to support the connecting elements. The supporting frames thus become part of the chassis. The number of the supporting frames can correspond to the number of the weighing frames so that there is one to one correspondence between them. Each lock thus locks one weighing frame to one supporting frame. In the first position, the weighing frames are thus locked to the supporting frames.

Each lock comprises cylinders each carrying a piston rod. Each cylinder is connected to one of the supporting frames and the weighing frames. Each piston rod is extendible into the other of the supporting frames and the weighing frames to lock the weighing frames and the supporting frames together. More specifically, each lock can comprise a pair of cylinders positioned collinearly with the pistons retractable inwardly and extendible outwardly together in the opposite directions. The ends of the pistons can engage the weighing frames to immobilize or stabilize them relative to the supporting frames. In this regard, each weighing frame can have a pair of locking members each with a seat. The cylinders can be fixedly connected to the supporting frames so that each end of the piston rods engages the seat to lock the weighing frames to the supporting frames.

BRIEF DESCRIPTION OF THE INVENTION

These and other features, aspects, and advantages of the present invention will become more apparent from the following description, appended claims, and accompanying exemplary embodiments shown in the drawings, which are briefly described below.

DETAILED DESCRIPTION OF THE DRAWINGS

FIGS. 1–27 show exemplary embodiments, which serve to illustrate the present invention. Same or corresponding elements are labeled with the same reference numerals.

Figure 1:
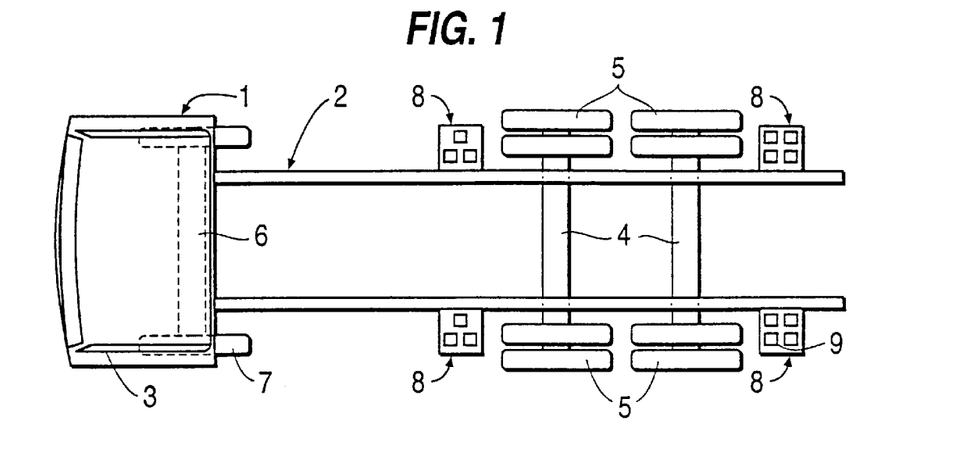
FIG. 1 shows a diagrammatic plan view of a transport or vehicle provided with a weighing device according to the invention.

FIG. 1 shows a transport or vehicle 1 comprising a chassis 2, a cab 3, rear axles 4 with wheels 5, a front axle with wheels 7, and four weighing units 8, which can be directly or indirectly connected to the chassis 2. The weighing units 8 can have a different number of connecting elements 9. The front pair has the corresponding number of connecting elements, as does the rear pair. In this instance, each front weighing unit 8 (in front of the rear axles 4) has three connecting elements and each rear weighing unit 8 (behind the rear axles 4) has four connecting elements 9.

Figure 2:
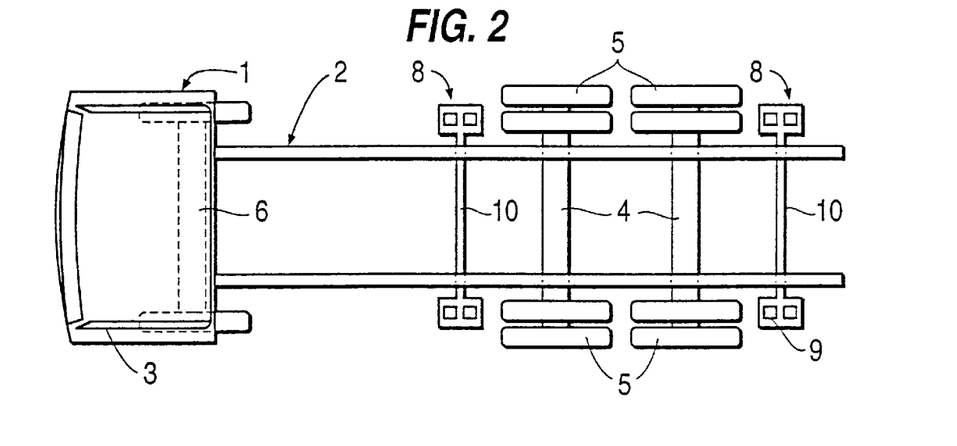
FIGS. 2 and 3 are plan views similar to FIG. 1, showing the modified embodiments thereof.

In the embodiment of FIG. 2, each weighing unit 8 positioned in front of and behind the rear axles 4 has two connecting elements 9. The front weighing units 8 mounted at the opposite sides of the chassis 2 are connected with a connecting beam 10 extending transversely to the transport (parallel with the rear axles 4). Similarly, the rear weighing units 8 mounted at opposite sides of the chassis are connected with a connecting beam 10 extending parallel with the rear axles 4.

Figure 3:
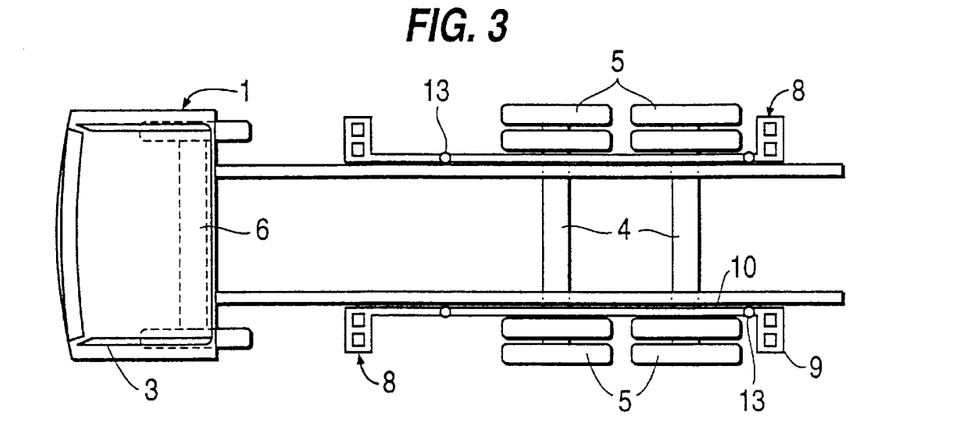
Figure 4:
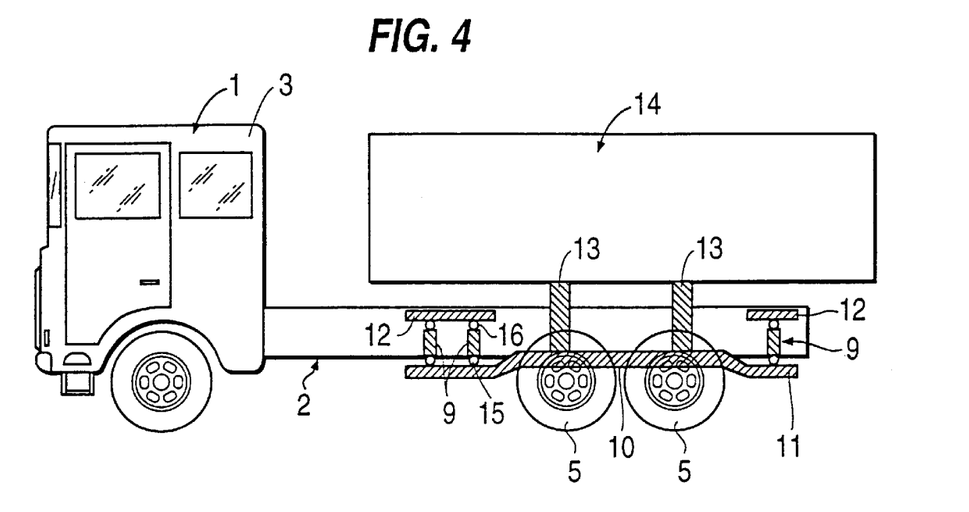
FIG. 4 shows a side view of a transport provided with another embodiment of a weighing device according to the present invention, illustrating a weighing mode.

In the embodiment of FIG. 3, each weighing unit 8 has two connecting elements, similar to that of FIG. 2. In FIG. 3, however, the front and rear weighing units 8 positioned at the same side of the chassis 2 are connected with a connecting beam 10, which extends parallel with the transport vehicle (perpendicular to the rear axles 4). Four hydraulic cylinders or jacks 13 are positioned on the connecting beams 10, two on each side of the chassis, one in front of and one behind the rear axles 4. The cylinders or jacks can be used to lift the load, for example, the container 14, from the chassis 2, as indicated in FIG. 4, where the load is weighed in this position. After weighing, the cylinders or jacks 13 lower the container 14 onto the chassis 2 for stable support. As seen from the plan view, the connecting elements 9 are positioned in different vertical planes extending parallel to the longitudinal axis of the chassis.

Figure 5:
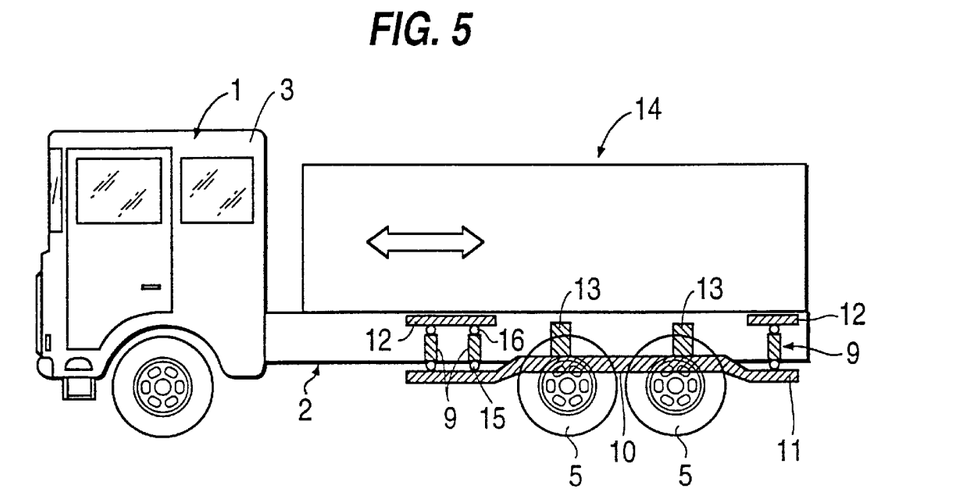
FIG. 5 shows a side view corresponding to FIG. 4, illustrating a transporting mode.

As appears from FIGS. 4 and 5, the connecting beam 10 establishes an integral connection between weighing frames 11 of two weighing units 8. Each connecting element 9 of the weighing units 8 is suspended from a respective supporting frame 12, which can be connected to the chassis 2. Each connecting element 9 has its lower end or side connected to a weighing frame 11 (connection point or joint indicated by 15) and its upper end or side connected to the respective supporting frame 12 (connection point or joint indicated by 16). The connecting element 9 can include a load cell 17 or the load cell 17 itself can comprise the connecting element 9. Instead of a container 14, one can also place a loading body or loading frame connected to the weighing frames 11 through the cylinders or jacks 13.

Figure 6:
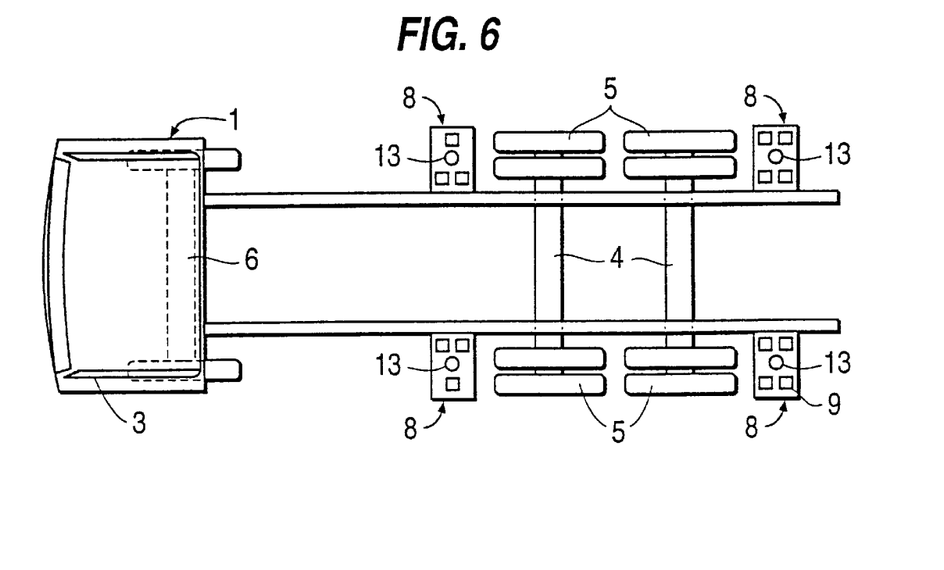
FIGS. 6 and 7 are plan views similar to FIGS. 1–3, illustrating the modified embodiments thereof.

FIG. 6 shows an alternative embodiment where the cylinders or jacks 13 are directly connected to the weighing frames 11. See FIGS. 8–10. As seen from the plan view, the cylinders 13 are centered in the middle between the connecting elements 9 connected to the weighing frames 11 to distribute the load uniformly.

Figure 7:
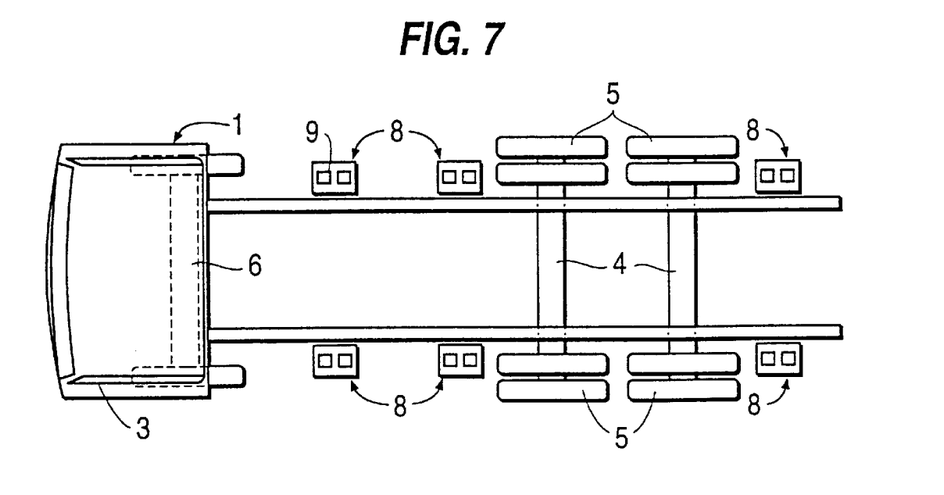

FIG. 7 is similar to the embodiments shown in FIGS. 1 and 2, but provided with another set of weighing units 8 mounted toward the front axle 6. This allows the force exerted by a load to be distributed over a greater distance.

Figure 8:
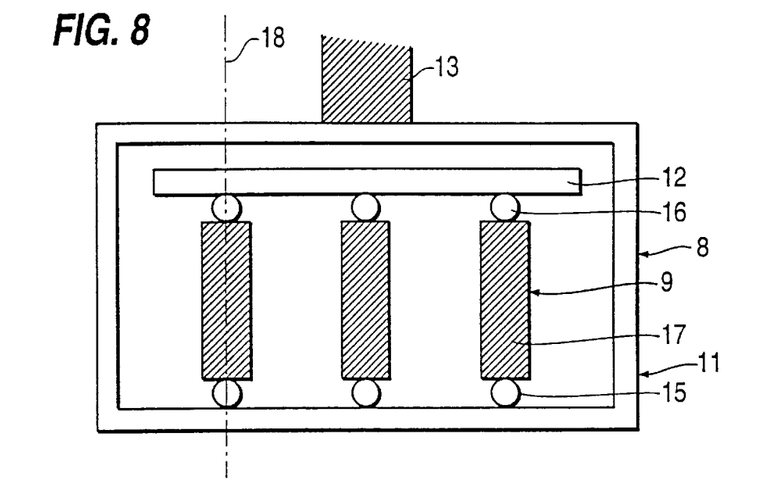
FIG. 8 is a diagrammatic side view of a weighing unit according to the present invention.

FIG. 8 shows an embodiment of a weighing unit 8, as can be applied, for example, in FIG. 6. Here, the weighing frame 11 has a box-like configuration. The cylinder 13 rests on the upper wall thereof. The weighing frame 11 is suspended from the supporting frame 12 through the connecting elements 9. When weighing, the cylinders resting on the weighing frame 11 lift the load off the chassis 2 or the supporting frame 12. Since the connecting elements 9 suspend the weighing frame 11 now supporting the load, the connecting elements 9 will be tensioned (so that the distance between the connection points 15, 16 increases with the load increase).

Figure 9:
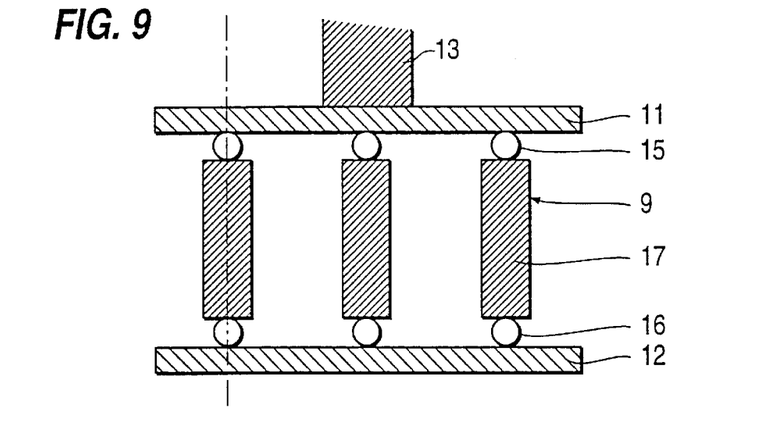
FIG. 9 is a diagrammatic side view similar to FIG. 8, showing a modified embodiment thereof.

FIG. 9 shows an alternative arrangement of FIG. 8, where the supporting frame 12 supports the weighing frame 11 from below. The upper end of each connecting element 9 is connected (15) to the weighing frame and the lower end of each connecting element is connected (16) to the supporting frame 12. Again, when weighing, the cylinders 13 resting on the weighing-frame 11 lift the load off the chassis 2 or the supporting frame 12. Since the weighing frame 11 rests on the connecting elements 9, the connecting element will be compressed (so that the distance between the connection points 15, 16 decreases with the load increase). During weighing, it may be desirable to stabilize the load or the weighing frame 11 in the horizontal direction. The stabilizing devices are described below with reference to FIGS. 15–23 and 25–27.

Figure 10:
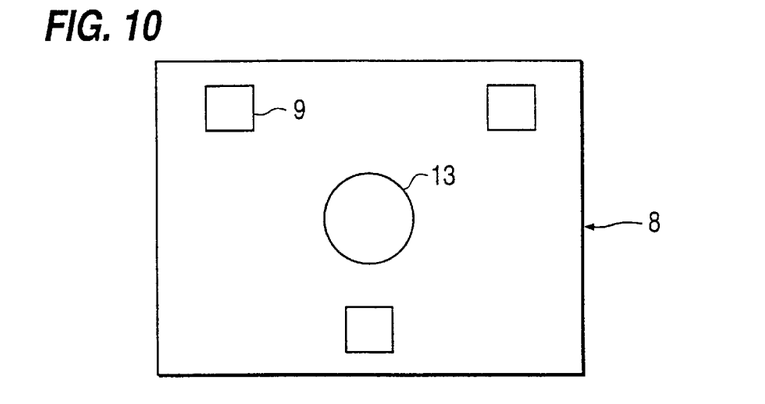
FIG. 10 is a diagrammatic plan view FIGS. 8 and 9.

FIG. 10 diagrammatically shows a plan view illustrating the arrangement of the connecting elements 9 in relation to the hydraulic cylinder 13, as it is applied in the embodiments according to FIGS. 8 and 9. In FIGS. 8 and 9, a force introduction axis going through the connecting points of the elements 9 is indicated by reference number 18.

Figure 11:
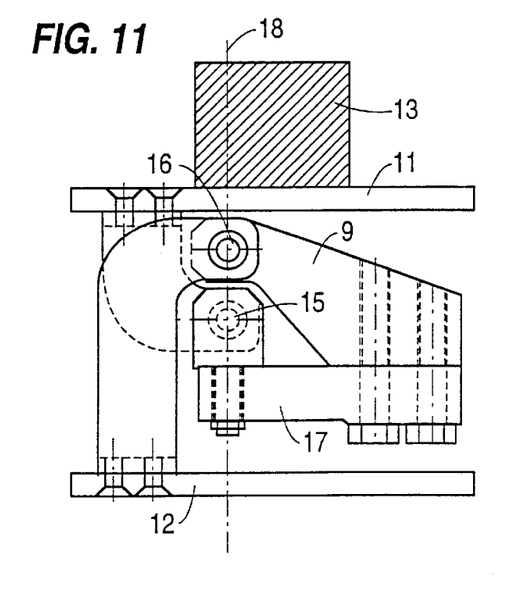
FIGS. 11, 12, and 13 respectively show side, end, and plan views of a part of a weighing unit having a connecting element incorporating a load call for measuring a bending strain corresponding to the applied load.
Figure 12:
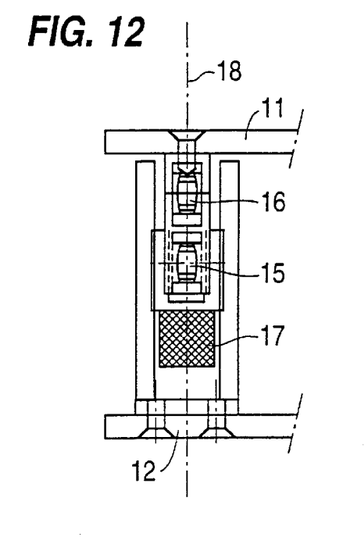
Figure 13:
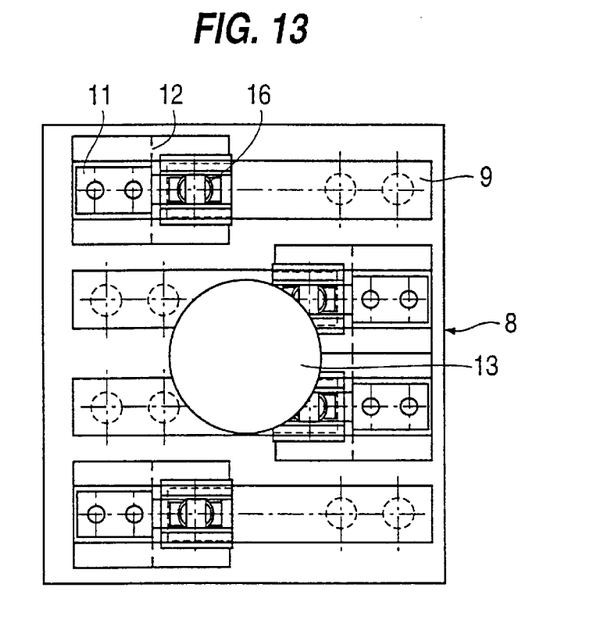

FIGS. 11, 12, and 13 show an embodiment of a connecting element 9 that can be used with the weighing unit 8. Similar to the embodiment of FIG. 9, the cylinder 13 rests on the weighing frame 11, which rests on the connecting element 9 positioned thereon, which in turn rests on a supporting frame 12. The connecting element 9 has a cardan-like designed connecting points or joints 15 and 16, one of which connects to one end of a load cell 17. One end of the upper connection member (not numbered) of the connecting element 9 is connected to the supporting frame 12 at the connection point or joint 16. One end of a lower connection member (not numbered), which comprises the load cell 17, is connected to the weighing frame 11 and the other end of the lower connection member is connected to the upper connection member. As a load applied to the weighing frame 11 increases, the distance between the joints 15, 16 increases. That is, while the upper connection member is rigid and stationary, the load cell is designed to flex corresponding to the load applied. The force introduction axis is again indicated by 18.

Figure 14:
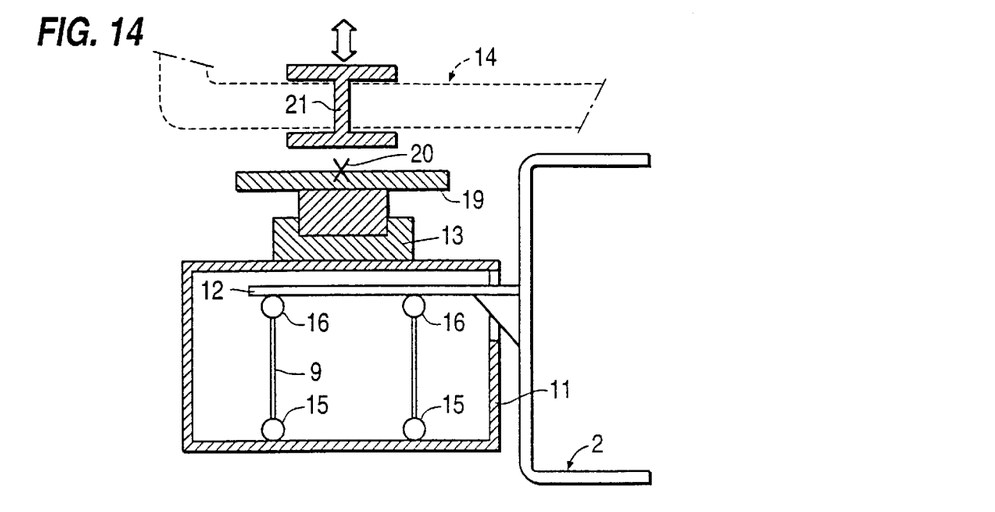
FIGS. 14, 15, and 16 respectively show a crosssection, a longitudinal section, and a plan view of a weighing unit mounted to the transport chassis.
Figure 15:
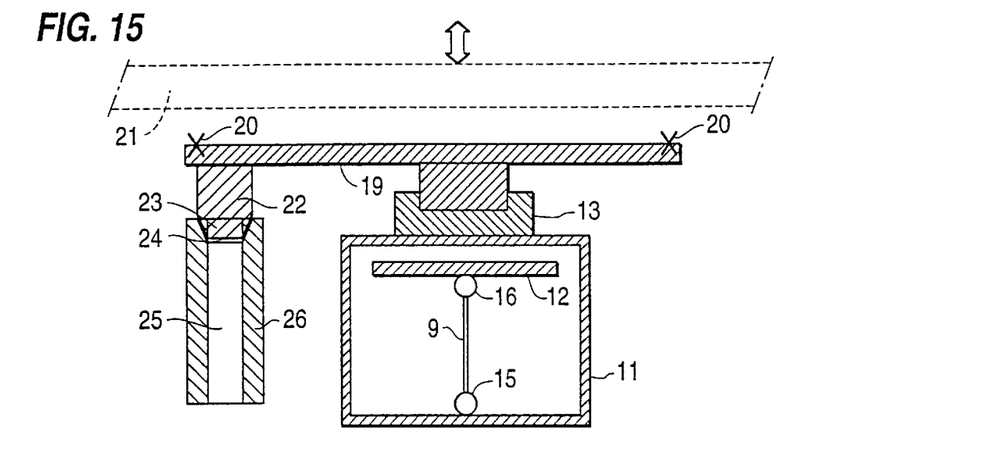
Figure 16:
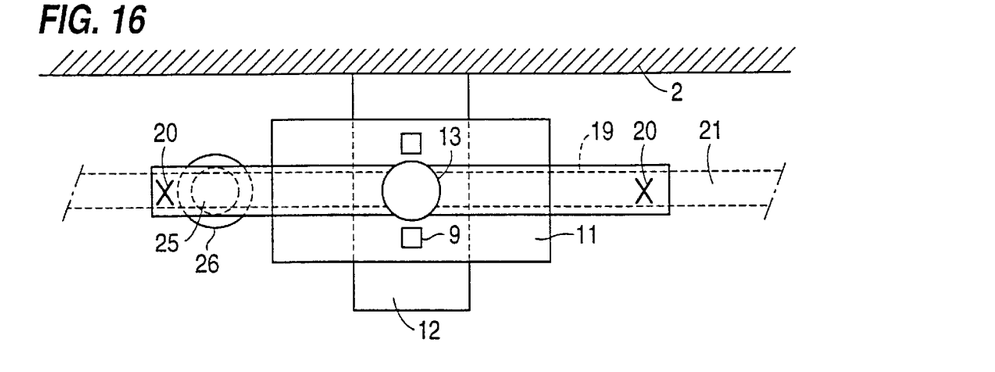

FIGS. 14, 15, and 16 show an embodiment that includes a supporting member 19 mounted to the jack 13 resting on the weighing frame 11 for supporting the load. The supporting member 19 can be provided with at least two supporting points 20 on which a longitudinal beam 21 of a container 14 or a loading body can bear against during weighing thereof. One can also select a different number of supporting points 20. The supporting points 20 are mounted in relation to the connecting elements 9 in such a way that, as seen from the plan view, a connecting line between the supporting points 20 is perpendicular or square to the plane going through the connecting elements 9 as appearing, particular from FIG. 16. Here, the supporting frame 12 of the weighing unit 8 is designed as a console that can be connected to the vehicle chassis 2.

The supporting member 19 can be provided with a stabilizing pin 22 having a conical lower portion 23, which can be received in a complementary conical opening or seat 24 formed in a supporting bushing 26 directly or indirectly connected to the chassis 2. The bushing 26 can also have a bore 25, which is adapted to guide an extension pin 27, as will be explained with reference to FIG. 17. On lowering the load, after weighing it, the conical portion 23 seats in the complementary conical seat 24 so that the load can bear on the points 20 to relieved the connecting elements 9.

Figure 17:
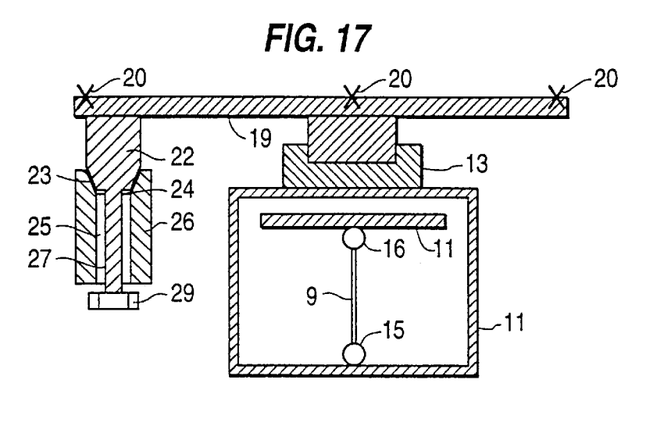
FIG. 17 shows a weighing unit similar to FIG. 15, illustrating a modified embodiment thereof.

The embodiment of FIG. 17 is substantially similar to that FIG. 15, except that FIG. 17 shows a greater number of supporting points. Moreover, to stabilize the load during weighing, FIG. 17 has an extension pin 27 extending in the bore 25 in the bushing 26. There is a clearance between the extension pin 27 and the bore 25. The extension pin 27 can include a head 29 to prevent undesirable tilting caused by a too oblique position of the vehicle. This arrangement can stabilize the load during weighing and during transporting modes.

Figure 18:
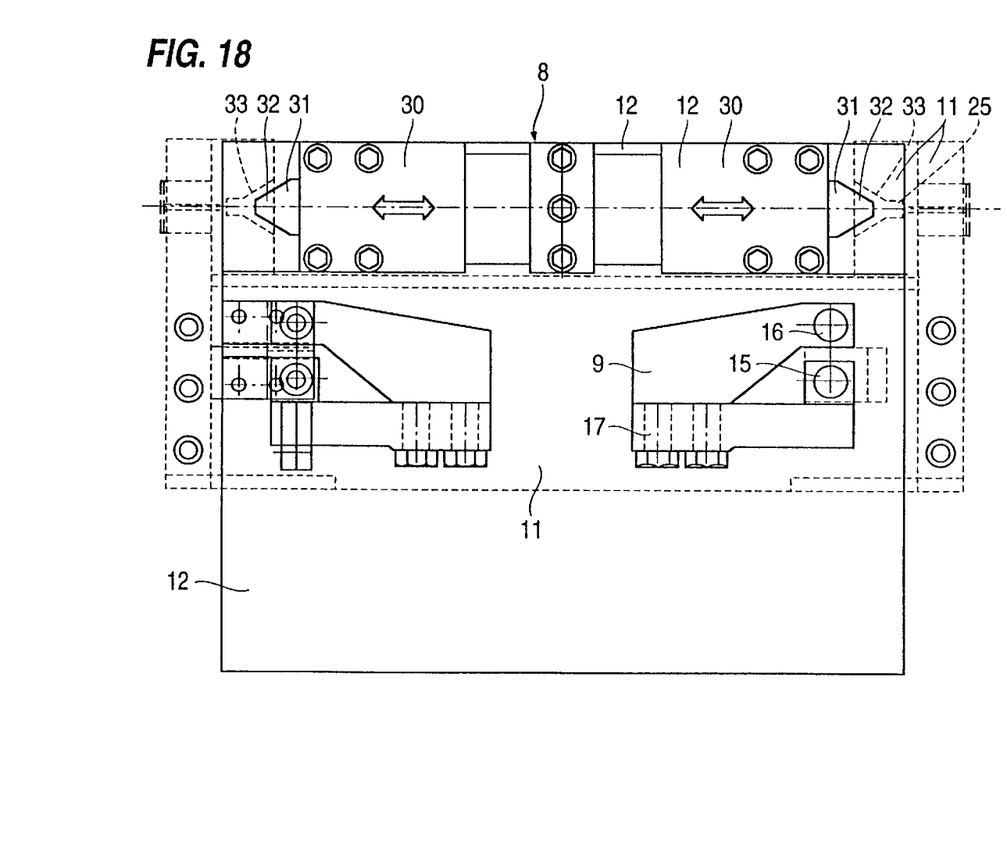
FIGS. 18 and 19 respectively show side and end views of another embodiment of a weighing device including the connecting elements similar to FIGS. 11–13, and a stabilizer.
Figure 19:
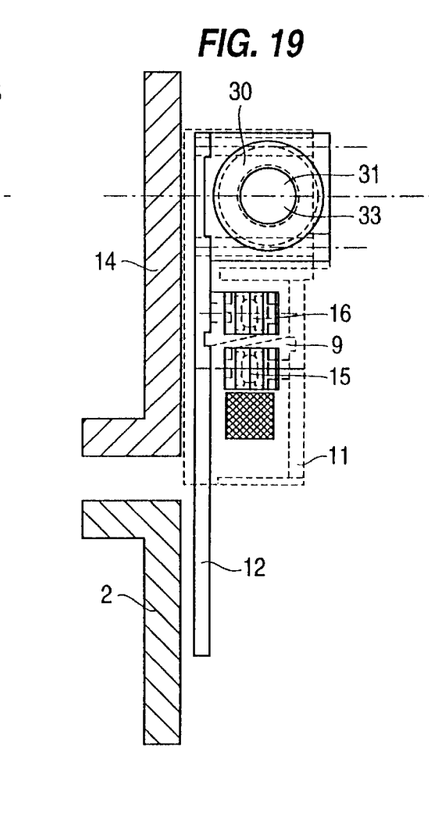

FIGS. 18 and 19 show an embodiment of a weighing device that can eliminate a lifting cylinder or jack 13. At least two weighing units 8, one on each lateral side of the transport or vehicle, are used. Only one of the weighing units is shown. The weighing unit 8 according to this embodiment includes a supporting frame 12, which can be directly or indirectly connected to the transport chassis 2. The weighing frame 11 can be connected to the load, for example, the container 14. In this embodiment, similar to the other embodiments described above, at least one connecting element 9 suspends each weighing frame 11. Two or more connecting elements 9 are preferable for each weighing unit 8, as shown. The connecting elements 9 are connected to the frames 11, 12 in a cardan-like manner, as described before, with the connection points or joints 15 and 16 situated close to each other. The connecting element 9 is under strain of tension and is provided with a load cell 17 measuring the strain of a bar element as it bends due to the load.

As shown in FIG. 18, two connecting elements 9 suspend each weighing frame 11 relative to the supporting frame 12 during weighing of the load. During transporting, however, the weighing frame 11 is locked to the supporting frame 12.

For this purpose, a lock immobilizes one of the weighing frames 11 to one of the supporting frames 12. The lock includes two horizontally positioned in-line pneumatic or hydraulic cylinders 30 having opposed piston rods 31 that move in the opposite directions. The cylinders can be connected to one of the supporting and weighing frames. In the embodiment shown in FIGS. 18 and 19, the cylinders are connected to the supporting frame 12. Each piston rod 31 has a conical end portion 32 that seats in a locking member fixedly mounted to or integral with the weighing frame 11. The locking member has a bore 25 with a complementary conical opening or seat 33 for receiving the conical end portion 32. As shown, the locking members are connected to the weighing frame 11. Alternatively, the cylinders 30 can be attached to the weighing frame 11 and the locking members with the conical seats 33 connected to the supporting frame 12. Moreover, instead of two cylinders, a single cylinder with two oppositely moving piston rods extending in the opposite direction can be used.

In operation, during transporting, while the load is not being weighed, the load or the container 14 can be stabilized by securing or locking the weighing frame 11 to the supporting 12 frame by bringing the conical portions 32 of the two piston rods 31 into the conical seats 33. Forcibly moving the conical portions 32 in the conical seats 33 can raise or lift the load to relieve stress from the connecting elements 9. To weigh the load, the piston rods are retracted, releasing the weighing frame 11 from the supporting frame 12. Now the load is supported solely on the connecting elements 9, enabling an accurate weighing of the load. Locking the weighing frame 11 to the supporting frame 12 is further advantageous because the load can be loaded and unloaded from the container 14 in a stabilized condition. The load, however, can be also weighed as it is being loaded or unloaded by suspending the weighing frames 11 during that stage.

Figure 20:
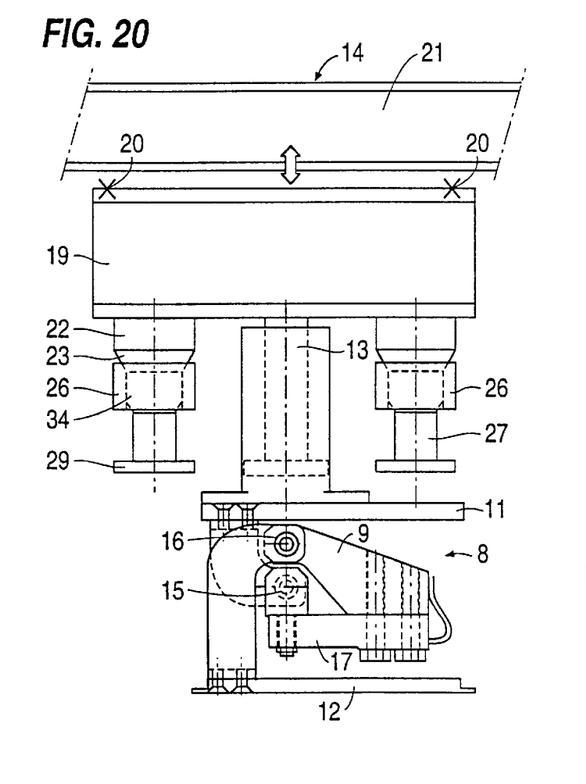
FIGS. 20 and 21 respectively show side and end views of another embodiment of a weighing device according to the invention.
Figure 21:
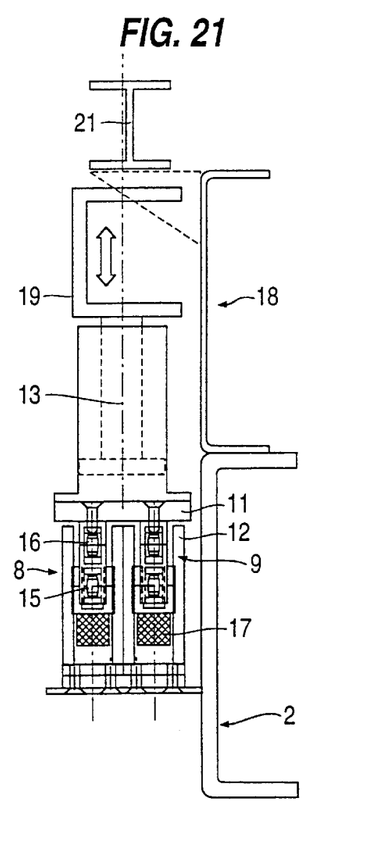

FIGS. 20 and 21 show a weighing unit 8 in which connecting elements 9 as described with reference to FIGS. 11–13 and 18–19 and a supporting member 19 and a stabilizing pin as described with reference to FIGS. 15–17 are used. In this embodiment, the supporting member 19 rests on the cylinder 13, which rests on the weighing frame 11. The supporting member 19, which has supporting points 20 in the shape of a longitudinal beam, rests on the weighing frame 11, which in turn is suspended relative to the supporting frame 12 using the connecting elements 9. A longitudinal beam 21 of a container 14 or of a loading body or loading frame can be supported on the points 20. In this embodiment, the supporting member 19 has two pins 22 having a conical portion 23 that can seat in the conical opening or seat 24 formed in the bushing 26. The pin 22 is further provided with a transition portion 34 between the conical portion 23 and the extension pin 27. The diameter of this transition portion 34 is such that it can be slideably received within the bore 25 of the bushing 26. The extension pin 27 having the smallest diameter is again provided with the head 29.

Figure 22:
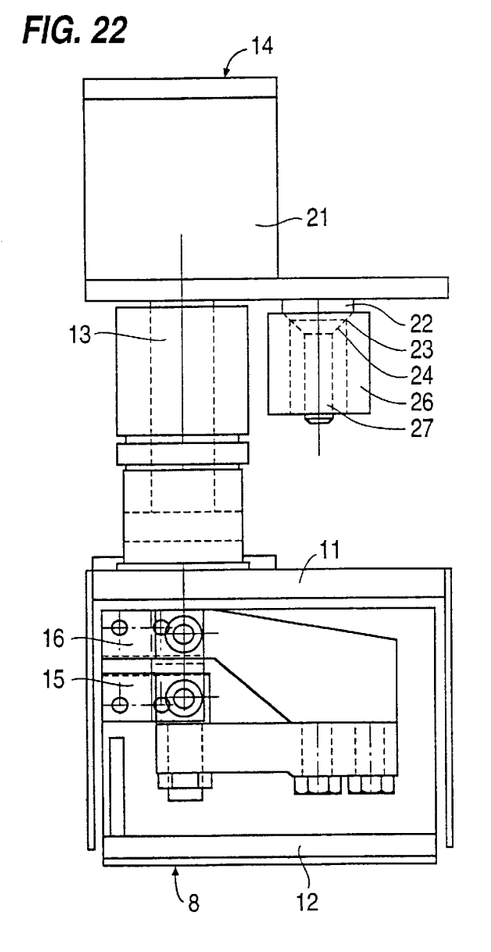
FIGS. 22 and 23 respectively show side and end views of yet another embodiment of a weighing device according to the invention.
Figure 23:
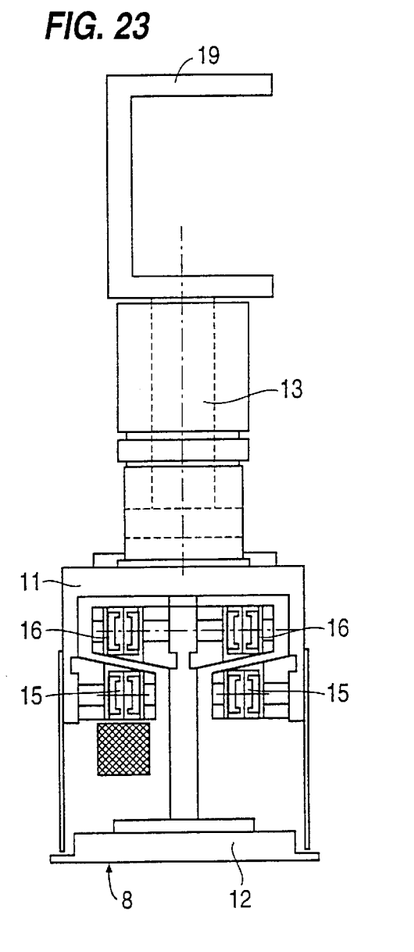

FIGS. 22 and 23 show a weighing unit 8 having two load cells 17, as described by way of FIGS. 20 and 21. The connecting elements 9 again have been secured to the weighing and supporting frames 11 and 12, respectively at the connection points or joints 15 and 16. The supporting member 19 is a part of a loading frame or loading body 14 provided with a beam 21. With the help of the jack 13, the loading body 14 can be lifted from its support on the chassis 2 during weighing. The support takes place using the pin 22 and the bushing 26, which is mounted directly or indirectly to the chassis 2, similarly as described with reference to FIG. 15.

Figure 24:
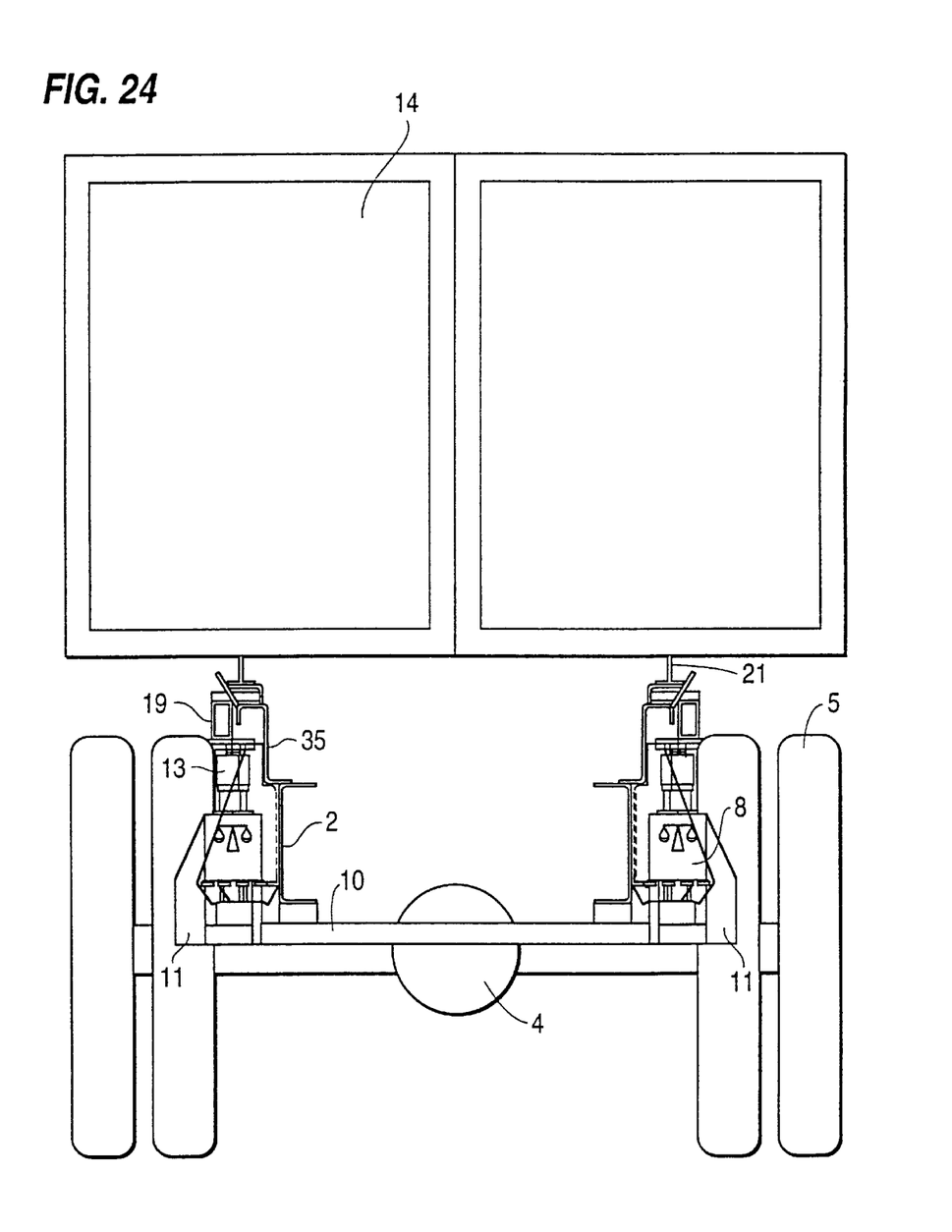
FIG. 24 shows a rear view of a transport provided with a weighing device according to the invention, with a load container mounted on the vehicle.

FIG. 24 shows a rear view of a transport or vehicle with an auxiliary frame 35 fixedly connected to the chassis 2. Similarly as shown in FIG. 2, the weighing units 8 are connected with the connecting beam 10, which is positioned behind the rear axle 4. The container 14 is again provided with the longitudinal beams 21.

Figure 25:
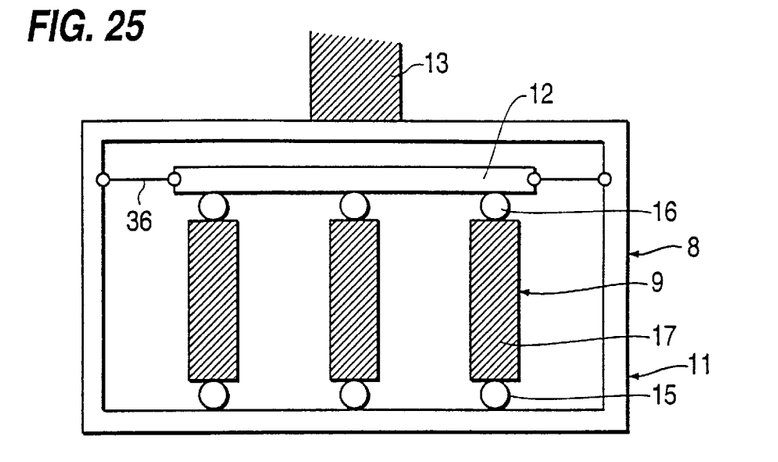
FIGS. 25, 26, and 27 respectively show end and plan views similar to FIGS. 8, 9, and 10, illustrating the modified embodiments thereof.
Figure 26:
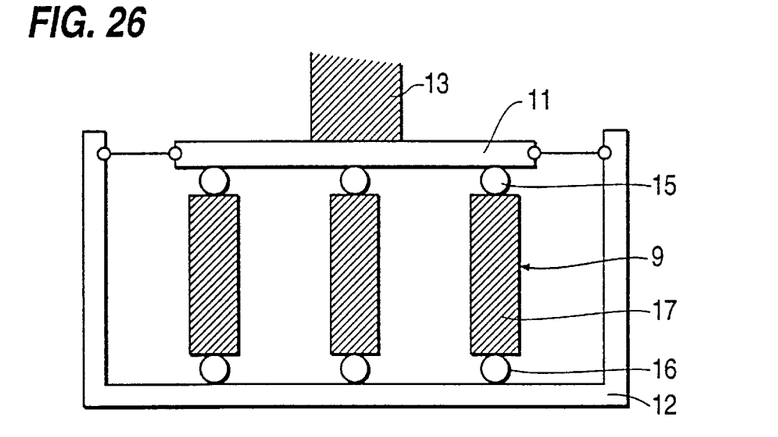
Figure 27:
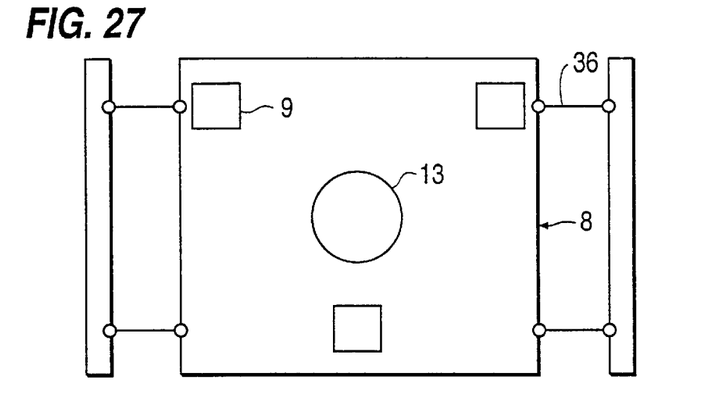

FIGS. 25–27 shows other embodiments of weighing units, which are similar to those according to FIGS. 8, 9, and 10. In these embodiments, however, the weighing frame 11 is laterally supported to the supporting frame 12 using lateral supporting elements 36, where their lengths can be adjusted.

The present invention provides many advantages. For instance, by employing a sufficient number of weighing frames 11 and connecting elements 9, the capacity of the connecting elements can be kept low and the dimensions of the connecting elements 9 and of their connecting points 15, 16 can be kept small. The cardan, movable or flexible joints can lie closely beneath each other to reduce the height of the weighing unit. Additionally, the load stabilizer can stabilize the load at least while transporting it, and can even stabilize while weighing.

Further, the weighing device according to the invention can have the weighing frames move laterally in relation to the vehicle chassis. In this regard, the connecting elements can move laterally to enable the lateral movement of the weighing frames.

In many cases, it will be desirable to connect the supporting frames connected to the connecting elements to the chassis using consoles protruding from the chassis. Accordingly, more choices are available for positioning the connecting elements and the weighing frames in relation to the chassis.

The load can be a container to be rolled onto the vehicle. The container can have two longitudinally extending supporting beams at the bottom side, which in transport condition will bear on the chassis, or an auxiliary frame connected thereto.

Further, means can be present for changing the position of the force introduction axes going through the load cells. In particular, the axes can extend vertically so that a direct determination of the weight of the load can take place. When the position is not vertical, the angle of the axis enclosing with the vertical can be determined and the weight of the load can be determined based on the determined angle.

Each weighing frame can be connected to the lowermost situated end of the connecting elements and can extend upwardly, using a holder, into a space higher than the uppermost situated end of the connecting element.

Although in principle, loosely positioning the load on the weighing frames is possible, in most cases the load can be stabilized in relation to the chassis or a weighing frame during weighing, using a holder with at least two supporting points.

For enabling a simple mounting of a weighing device according to the invention, a weighing frame and a supporting frame together with the connecting elements can be designed as a weighing unit, which can be connected to the chassis.

Further, at least two weighing frames can be connected by a rigid connecting member extending in longitudinal direction of the chassis, or transversely thereto so that two or more weighing frames will function as a unit. The connecting member can thus extend parallel to the chassis beams, and externally around the wheels, and it can also extend transversely to the chassis beams underneath them, over them, or through recesses situated in them.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

I claim:

1. A weighing device for weighing a load carried by a vehicle, which device is adapted to be mounted to a vehicle, comprising:
   at least two weighing frames for supporting a load to be weighed, wherein the weighing frames are adapted to be suspended from a chassis of the vehicle;
   a plurality of connecting elements, each having an upper connecting joint and a lower connecting joint, wherein one of the upper and lower joints of each of the connecting elements is adapted to be operatively connected to the chassis and the other of the upper and lower joints is connected to one of the weighing frames to thereby suspend the weighing frames from the chassis, each of the connecting elements carrying a load cell for measuring the force exerted thereto by the weighing frame; and
   a stabilizer adapted to be operatively connected to the chassis and the weighing frames for selectively immobilizing the weighing frames relative to the chassis.

2. A weighing device according to claim 1, wherein the load is adapted to exert a force through an axis extending through the upper and lower joints of each connecting element to apply a strain to each of the load cells, the strain corresponding to the load applied thereto.

3. A weighing device according to claim 2, wherein the stabilizer comprises at least a pair of locks each movable between a first position and a second position, wherein in the first position, the locks are adapted to immobilize the weighing frames relative to the chassis, and in the second position, the locks are adapted to release the weighing frames from the chassis so that the connecting elements support the weighing frames.

4. A weighing device according to claim 3, further comprising supporting frames adapted to be fixedly connected to the chassis, the number of the supporting frames corresponding to the number of the weighing frames, wherein in the first position, the locks lock the weighing frames to the supporting frames.

5. A weighing device according to claim 4, wherein the upper joints are connected to the supporting frames and the lower joints are connected to the weighing frames.

6. A weighing device according to claim 4, wherein each of the locks comprises cylinders each carrying a piston rod, each of the cylinders being connected to one of the support frames and the weighing frames, wherein each of the piston rods is movable into the other of the support frames and the weighing frames to lock the weighing frames and the supporting frames together.

7. A weighing device according to claim 4, wherein each lock locks one of the weighing frames to one of the supporting frames, wherein each lock comprises a pair of cylinders, each with a piston, positioned collinearly, wherein the pistons are adapted to move in the opposite directions.

8. A weighing device according to claim 7, wherein each of the weighing frames has a pair of locking members each with a seat, wherein the cylinders are fixedly connected to the supporting frames, wherein each end of the piston rods is adapted to engage the seat to lock the weighing frames to the supporting frames.

9. A transport with an on-board weighing device for weighing a load carried thereby, comprising:

a chassis;

at least two weighing frames suspended from the chassis for supporting the load;

a plurality of connecting elements suspendedly supporting the weighing frames, each connecting element having an upper connecting joint and a lower connecting joint, wherein one of the upper and lower joints of each of the connecting elements is operatively connected to the chassis and the other of the upper and lower joints is connected to one of the weighing frames to thereby suspend the weighing frames from the chassis, each of the connecting elements carrying a load cell for measuring the force exerted thereto by the weighing frame; and a stabilizer operatively connected to the chassis and the weighing frames to selectively immobilize the weighing frames relative to the chassis.

10. A transport according to claim 9, wherein the load exerts a force through an axis extending through the upper and lower joints of each connecting element to apply a strain to each of the load cells, the strain corresponding to the load applied thereto.

11. A transport according to claim 10, wherein the stabilizer comprises at least a pair of locks movable between a first position and a second position, wherein in the first position, the locks immobilize the weighing frames relative to the chassis, and in the second position, the locks release the weighing frames so that the connecting elements support the weighing frames.

12. A transport according to claim 11, further comprising supporting frames fixedly connected to the chassis, the number of the supporting frames corresponding to the number of the weighing frames, wherein in the first position the locks immobilize the weighing frames to the supporting frames.

13. A transport according to claim 12, wherein the upper joints are connected to the supporting frames and the lower joints are connected to the weighing frames.

14. A transport according to claim 12, wherein each of the locks comprises cylinders each carrying a piston rod, each of the cylinders being connected to one of the support frames and the weighing frames, wherein each of the piston rods is movable into the other of the support frames and the weighing frames to lock the weighing frames and the supporting frames together.

15. A transport according to claim 12, wherein each lock locks one of the weighing frames to one of the supporting frames, wherein each lock comprises a pair of cylinders, each with a piston, positioned collinearly, wherein the pistons are adapted to move in the opposite directions.

16. A transport according to claim 15, wherein each of the weighing frames has a pair of locking members each with a seat, wherein the cylinders are fixedly connected to the supporting frames, wherein each end of the piston rods engages the seat when the locks are in the first position to lock the weighing frames to the supporting frames.

* * * * *